(12) United States Patent
Amatucci et al.

(10) Patent No.: US 6,653,020 B2
(45) Date of Patent: Nov. 25, 2003

(54) METAL NITRIDE ELECTRODE MATERIALS FOR HIGH CAPACITY RECHARGEABLE LITHIUM BATTERY CELLS

(75) Inventors: Glenn G. Amatucci, Peapack, NJ (US); Nathalie Pereira, New York, NY (US)

(73) Assignee: Rutgers University Foundation, New Brunswick, NJ (US)

( * ) Notice: Subject to any disclaimer, the term of this patent is extended or adjusted under 35 U.S.C. 154(b) by 96 days.

(21) Appl. No.: 09/833,529

(22) Filed: Apr. 12, 2001

(65) Prior Publication Data
US 2002/0150818 A1 Oct. 17, 2002

(51) Int. Cl.[7] .................................. H01M 4/58
(52) U.S. Cl. .................... 429/229; 429/231.95
(58) Field of Search ................. 429/218.1, 220, 429/229, 231.1, 231.9, 231.95

(56) References Cited

U.S. PATENT DOCUMENTS 5,834,139 A * 11/1998 Shodai et al. ............... 429/330
6,423,106 B1 * 7/2002 Bates .......................... 29/623.1

FOREIGN PATENT DOCUMENTS

| JP | 8-78018 | * | 3/1996 |
| JP | 8-153537 | * | 6/1996 |
| JP | 11-3707 | * | 1/1999 |

* cited by examiner

Primary Examiner—Randy Gulakowski
Assistant Examiner—Jonathan Crepeau
(74) Attorney, Agent, or Firm—Lowenstein Sandler PC

(57) ABSTRACT

A high capacity rechargeable lithium battery cell comprising a positive electrode member, a negative electrode member, and an interposed separator member providing an electrolyte includes an active electrode material comprising a crystalline nitride of a metal which be lithium-alloying, such Zn, or non-alloying, such as Cu. The metal nitride electrode materials effectively replace carbonaceous negative electrode materials in Li-ion cells, providing significantly improved stable gravimetric capacity ranging to about 450 mAh/g and volumetric capacity ranging to more than five-fold that of graphite.

9 Claims, 5 Drawing Sheets

METAL NITRIDE ELECTRODE MATERIALS FOR HIGH CAPACITY RECHARGEABLE LITHIUM BATTERY CELLS

BACKGROUND OF THE INVENTION

The present invention relates to rechargeable electrochemical energy storage systems, particularly such systems comprising complementary electrodes capable of reversibly intercalating, alloying, or otherwise alternately combining with and releasing lithium ions in electrical energy charge and discharge operations. The invention comprises, in its preferred embodiments, high capacity lithium battery cells comprising metal nitride electrodes which provide exceptionally high, stable discharge capacity in such cells.

Early rechargeable lithium battery cells relied primarily on metallic lithium electrodes, but disadvantages associated with recharging of such cells, particularly the formation of dendrites which led to shorting within the cell, resulted, in addition to resident dangers, in limited useful cycle life of these cells. Lithium alloys with metals such as tin or aluminum showed some promise of improvement from the dangerous conditions attributed to pure lithium metal; however, the relatively large expansion fluctuations exhibited by these materials during cycling resulted in intraparticle damage which ultimately defeated initial cell capacity gains.

Carbonaceous electrode materials, such as petroleum coke, hard carbon, and graphite, have been widely investigated and are regularly employed in lithium and lithium-ion cells, but these materials are limited in volumetric capacity and present other difficulties, such as their contributing to the instability and degradation of electrolyte compositions. Investigators have turned in part to employing lithiating electrodes comprising oxides of Sn, Si, Sb, Mg, and the like and have had some success in avoiding the drawbacks seen in carbon materials, but cycle life of these cells has lacked significant note.

Some specialized lithiation materials, such as oxides of non-alloying transition metals and the amorphized lithiated nitrides of transition metals, have also been investigated with varying success in capacity stability and cell voltage output. For example, the latter materials, described by Shodai et al. in U.S. Pat. No. 5,834,139, have reportedly exhibited good capacity and cycling stability; however, cell output voltage is significantly higher than desired in commercial implementations, and, of greater import, these active electrode materials are reactive in ambient atmosphere and require careful attention to controlled environment to enable practical use.

SUMMARY OF THE INVENTION

In the present invention it has been discovered that an active electrode material comprising a crystalline nitride of a non-alkali or non-alkaline earth metal, which may be lithium-alloying, such as zinc, or non-alloying, such as copper, and may include others, such as silicon, aluminum, and the like, provides, in combination with an active electrode material source of lithium ions and an intervening electrically insulative, ion-conductive separator typically incorporating a non-aqueous electrolyte composition comprising a dissociable lithium salt, a rechargeable battery cell exhibiting superlative cycling stability and exceptionally high capacity. Particularly when compared with widely used carbonaceous electrode materials, the metal nitride cell electrodes of the present invention yield gravimetric capacities which range from about 70% to 140% that of graphite, while the volumetric capacities resulting from these new electrode materials extraordinarily range from about 285% to 530% of the 740 mAh/cm$^3$ of graphite.

BRIEF DESCRIPTION OF THE DRAWING

The present invention will be described with reference to the accompanying drawing of which.

DESCRIPTION OF THE INVENTION

Figure 1:
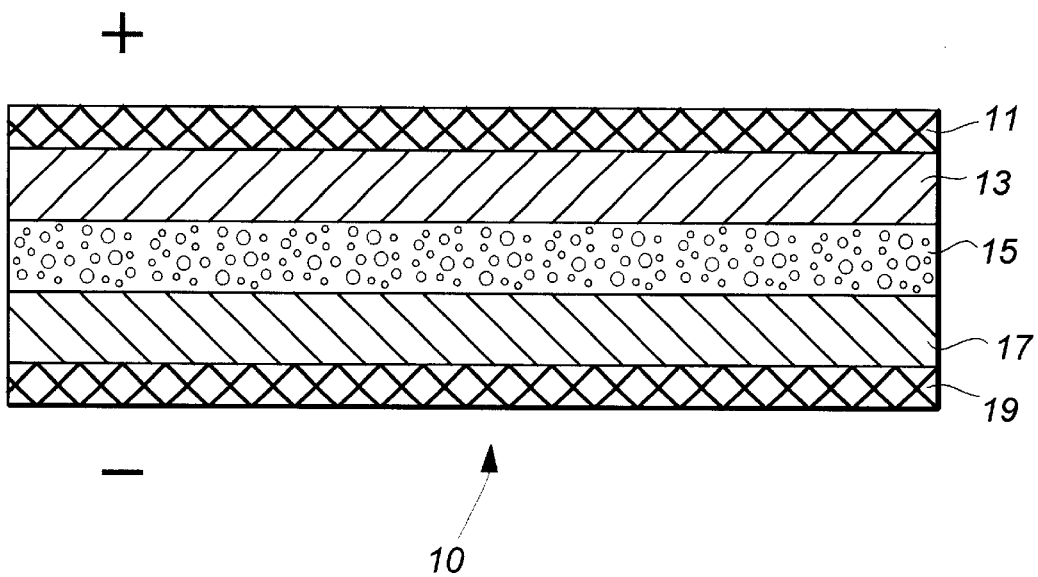
FIG. 1 depicts schematically in cross-section elevation a typical rechargeable electrochemical lithium-ion battery cell embodying the present invention.

As shown in FIG. 1, a rechargeable battery cell in which an active electrode material of the present invention may be employed is essentially of the same structure as the lithium and Li-ion battery cells currently in common use. In this respect, such a cell 10 comprises a positive electrode member 13, a negative electrode member 17 and an interposed electrically insulative, ion-conductive separator containing an electrolyte, typically in the form of a solution of a lithium salt in one or more non-aqueous solvents. Normally associated with the respective electrodes are electrically conductive current collectors 11, 19 which facilitate the application and withdrawal of cycling electrical current to and from the cell.

Further, the electrodes of the invention may be used in any of the common cell fabrication styles, e.g., the rigid metal casing compression style typified by the well-known "button" battery, or the semi-rigid or flexible film-encased laminated component polymer layer style of more recent development, such as is generally represented in FIG. 1 and more specifically described in U.S. Pat. No. 5,840,087. This latter style of laminated polymer battery cell was employed in the following examples, along with laboratory test cells of commonly used compressive Swagelok construction.

EXAMPLE I

In order to provide comparative operating data of battery cells comprising previously employed inorganic electrode materials, a number of test cells were fabricated in the manner of the prior art comprising, as a laboratory expedient, a lithium metal foil electrode member and an opposing electrode member comprising a lithiating metal or metallic oxide, such as Sn, Al, or $SnO_2$ powder, dispersed in a polymeric binder layer. In such a test configuration, the greater reducing potential of the metallic lithium, vis-à-vis a lithiated intercalation compound such as commonly employed in Li-ion cells, relegates that material to negative electrode member 17 while the complementary active material under examination comprises positive electrode member 13. The electrode members of each test were assembled, for ease of fabrication, in a Swagelok test cell with an intervening separator member 15 of borosilicate fiber saturated with a common lithium-ion cell electrolyte, e.g., a 1.0 M solution of $LiPF_6$ in an equipart mixture of ethylene carbonate (EC) and dimethylcarbonate (DMC). The stainless steel compressive plunger members of the Swagelok test cell functioned as current collectors 11, 19.

Figure 2:
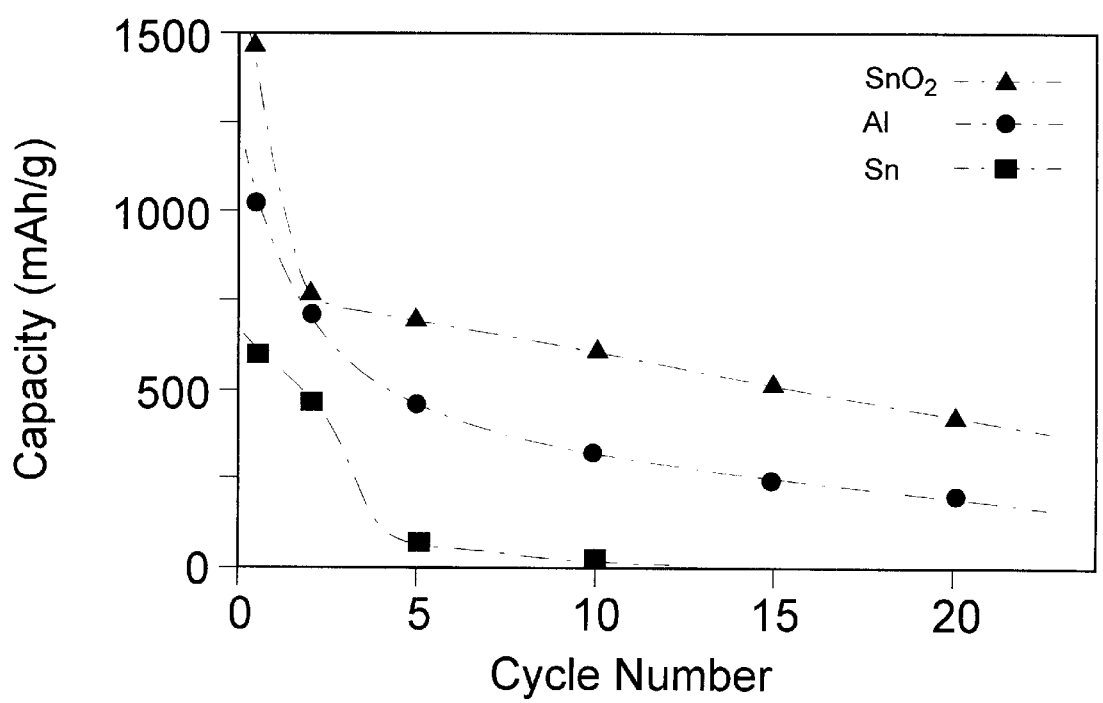
FIG. 2 presents the plots of comparative capacity stability of cells comprising various prior lithiating electrode materials.

Each of the test cells was cycled at the rate of about 14 mA/g in a commercial automatic cycle-control and data-recording apparatus, e.g., a MacPile controller. The discharge capacity of such cells over a number of charge/discharge cycles is shown in FIG. 2. These depicted data exemplify the rapid and continuous decline in operating capacity exhibited by prior cell electrode materials, despite initial capacities often exceeding 1000 mAh/g. A further disadvantage of these cells appeared in commercially unacceptable ranges of cycling voltages.

EXAMPLE II

In the search for lithiating electrode materials with satisfactory discharge capacity stability and desirable cycling voltage range, an electrode 13 of zinc nitride was assembled in a cell and tested in the foregoing manner. This electrode composition was formulated of 65 parts by weight of a commercial $Zn_3N_2$ powder (30–45 μm), 6.5 parts of Super-P conductive carbon, 10.5 parts of vinylidene fluoride-:hexafluoropropylene (88:12)copolymer, and 18 parts of dibutyl phthalate (DBP) plasticizer. A coatable dispersion of the foregoing composition in acetone was cast and air-dried to a flexible film layer from which a 1 cm² electrode sample was cut. The sample was immersed in diethyl ether to extract the DBP plasticizer component, dried, and then assembled as a positive member 13 with a similarly sized negative electrode member 17 of lithium foil on a nickel support and an intervening borosilicate glass fiber separator member 15 in a Swagelok test cell. A 1.0 M activating electrolyte solution of $LiPF_6$ in a 1:1 mixture of EC:DMC was added to the assembled members prior to sealing the cell.

Figure 3:
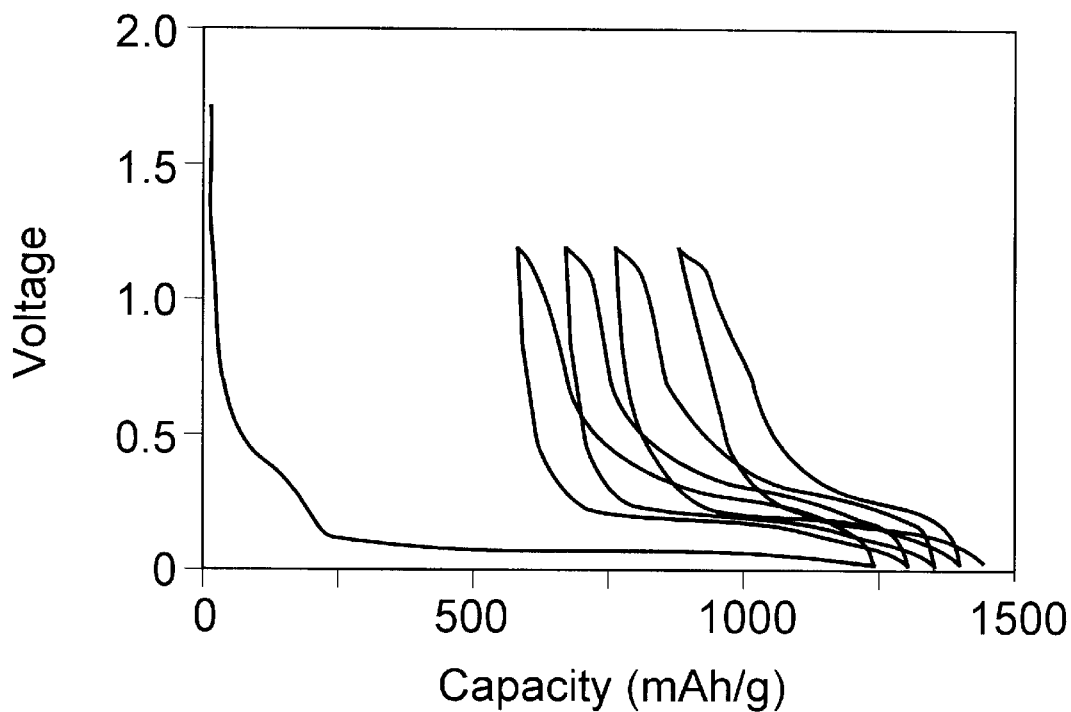
FIG. 3 depicts the characteristic voltage/capacity profile of a cycling rechargeable battery cell comprising $Zn_3N_2$ electrode material of the present invention.
Figure 4:
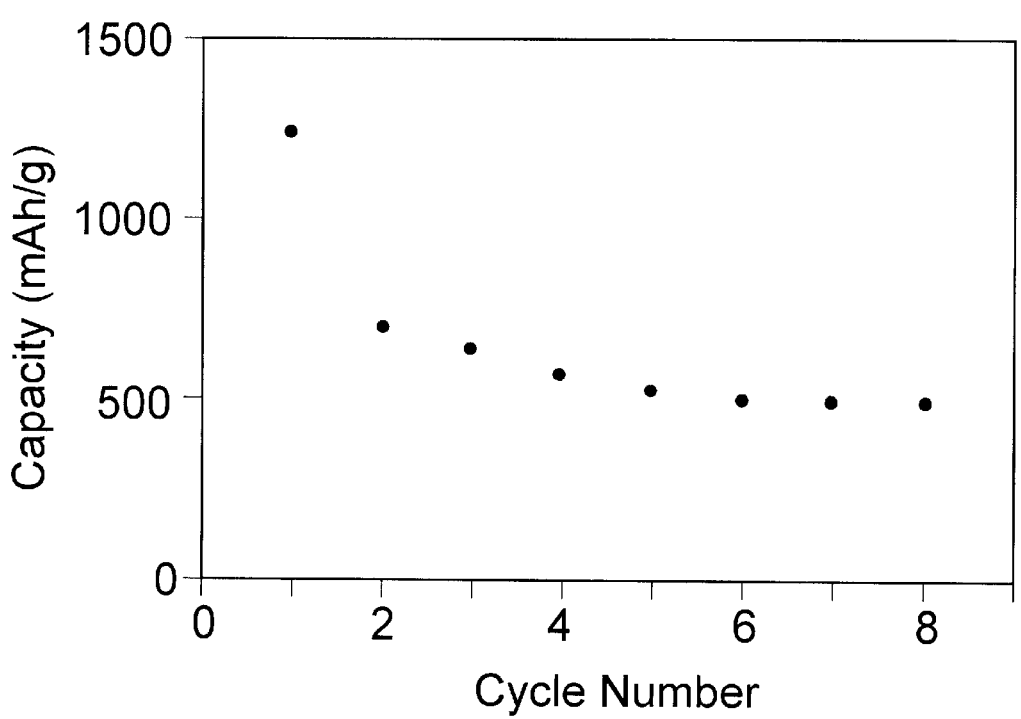
FIG. 4 depicts the plotted recycling capacity stability of the cell characterized in FIG. 3.

The test cell was cycled at a constant 14 mA/g and provided data for the voltage/capacity profile of FIG. 3 which shows, in comparison with known inorganic electrode materials, a remarkable early stabilization of discharge capacity, as seen in FIG. 4, at a about 500 mAh/g, representing a 45% increase over a typical, widely employed graphite electrode. Of still greater significance in the fabrication of energy storage cells for miniaturized utilization devices is the steady volumetric discharge capacity of about 3950 mAh/cm³, more than a five-fold increase over that of graphite, exhibited by the $Zn_3N_2$ electrode material of the present invention.

As a means for characterizing the mechanism by which the metal nitride electrode material achieves the noted desirable results, the composition of such material was followed during operative charge/discharge cycling, utilizing in situ x-ray diffraction (XRD) apparatus and procedures, e.g., such as described in U.S. Pat. No. 5,635,138. In the present test, the cell was initially discharged to 0.015 V at which the $Zn_3N_2$ electrode composition was lithiated to form an intermediate zinc alloy and lithium nitride:

$$Li^+ + Zn_3N_2 \rightarrow Li_3N + LiZn \quad (1)$$

Figure 5:
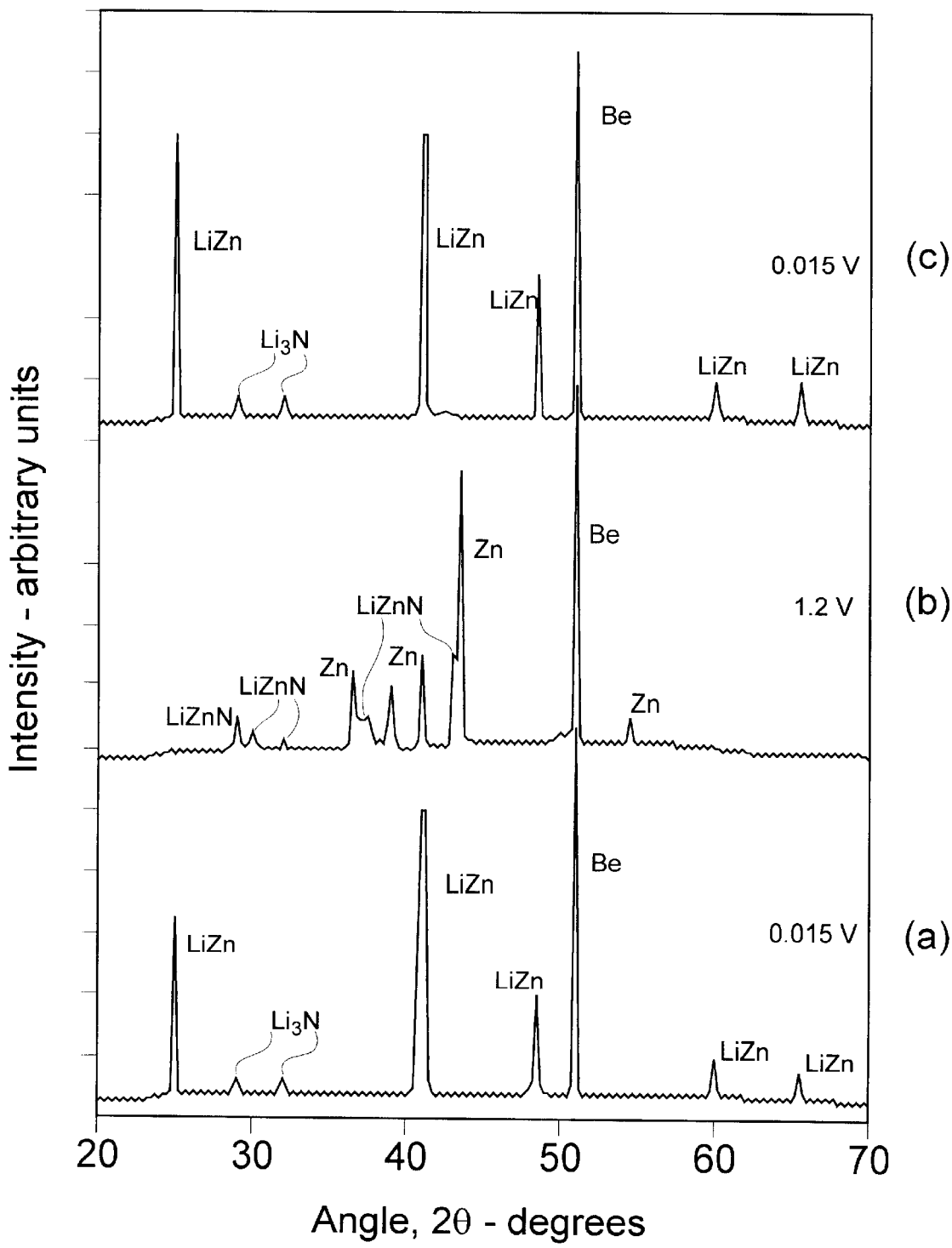
FIG. 5 depicts comparative in situ XRD traces of a rechargeable battery cell $Zn_3N_2$ electrode material of the present invention at various stages during reversible charge/discharge cycling.

This first stage in the composition cycling is shown at FIG. 5(a) by the characteristic $Li_3N$ and LiZn peaks, the Be peak arising from the beryllium window of the examination apparatus.

Upon the following cell recharging to 1.2 V, the electrode composition is reversibly converted by delithiation to include a zinc nitride form, with some reduced zinc, and then reverts to the lithiated components when the cell again discharges to the 0.015 V cutoff point, as each such stage is shown at FIGS. 5(b) and 5(c):

$$Li_3N + LiZn \leftrightarrow LiZnN + Li^+ \quad (2)$$

Although the initial material cost may be higher, the efficiency and ultimately the economics of the cell may be improved by utilizing LiZnN directly in place of the precursor $Zn_3N_2$ in the formulated electrode composition.

EXAMPLE III

A $Zn_3N_2$ electrode layer material of the foregoing example was combined, as negative electrode member 17, with a similarly cast polymeric layer comprising, as the active material of positive electrode member 13, a spinel intercalation compound, $Li_2Mn_2O_4$, instead of $Zn_3N_2$ to fabricate a rechargeable Li-ion battery cell. The thickness of the respective electrode layers, and thus the amount of active material in each electrode, was adjusted to provide a ratio of about 5:1 spinel:nitride compound. The resulting cell was activated with electrolyte and tested as in Example II to yield substantially similar performance. Use of such positive lithiated electrode materials of higher lithium content effectively resolves the irreversible capacity loss sometimes encountered during the initial charging cycle of Li-ion battery cells.

EXAMPLE IV

Figure 6:
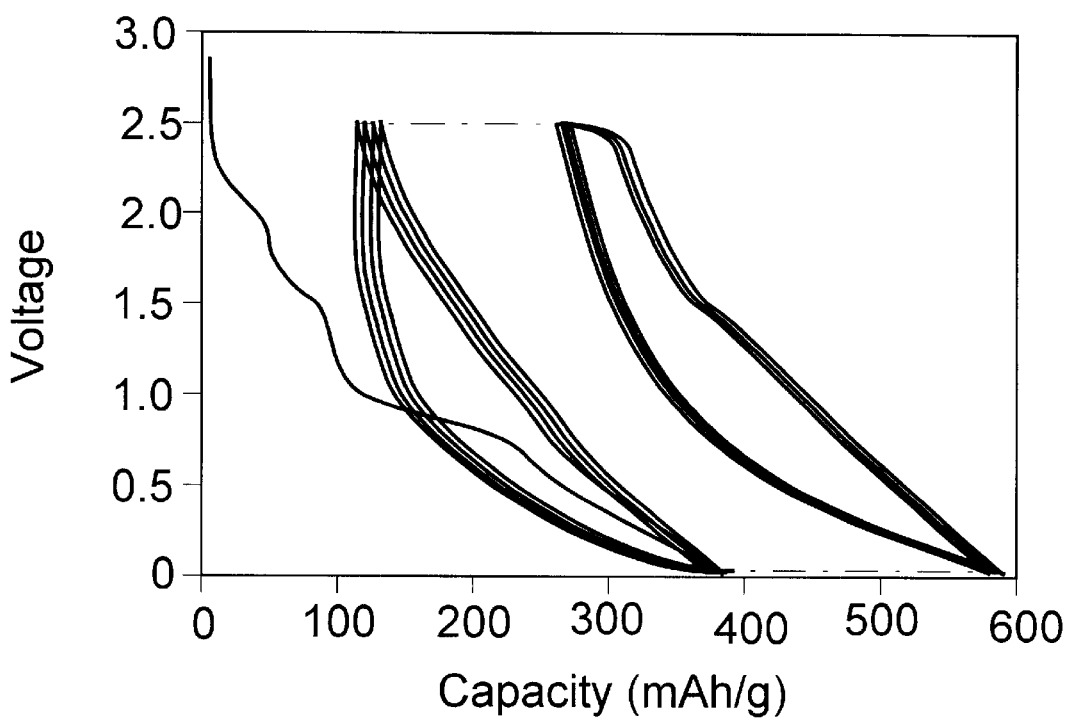
FIG. 6 depicts the characteristic voltage/capacity profile of a cycling rechargeable battery cell comprising $Cu_3N$ electrode material of the present invention.
Figure 7:
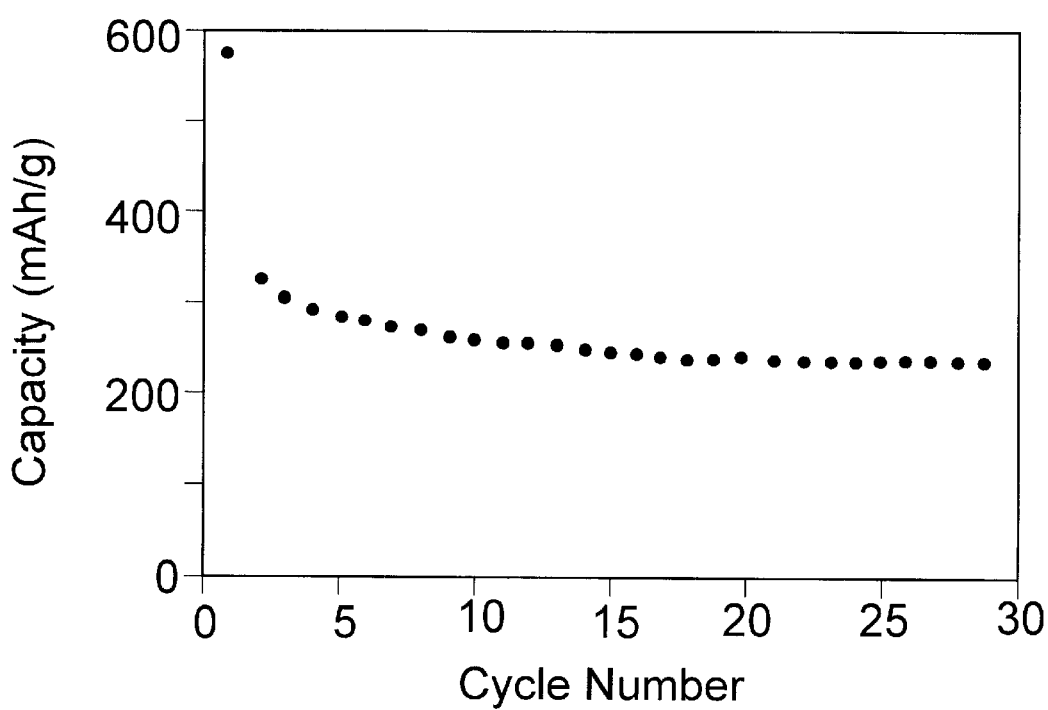
FIG. 7 depicts the plotted recycling capacity stability of the cell characterized in FIG. 6.

Further investigation into the cycling mechanism of the metal nitride electrode materials revealed the substantial similarity between such mechanisms of nitrides of metals not normally alloying with lithium and alloying metals, such as described in the foregoing examples. Of such non-alloying metals, copper, in the nitride electrode form, yields a most advantageous rechargeable battery cell, providing a remarkably stable discharge capacity at about 250 mAh/g and a volumetric capacity of about 2100 mAh/cm³, nearly 290% that of graphite electrode material, in addition to a generally preferred operating voltage range. In order to acquire these performance data, a test cell was prepared in the manner of Example II with the exception of the use of powdered $Cu_3N$ instead of $Zn_3N_2$. Cycling discharge and charge of the cell as described in Example II provided data as depicted in the voltage/capacity plot of FIG. 6 and exhibited in the stable gravimetric discharge capacity shown in FIG. 7.

The mechanism of cell cycling is similar to that of the above-describe alloying zinc nitride material in that the initial $Cu_3N$ composition, as depicted in the stage (a) ex situ XRD trace of FIG. 8, discharges in the following manner to the 0.015 V cutoff point to yield reduced copper and the lithiated nitride, and then reversibly reverts to the $Cu_3N$ form upon recharge to the 2.5 V upper operating limit:

$$Li^+ + Cu_3N \leftrightarrow Li_3N + Cu \qquad (3)$$

Figure 8:
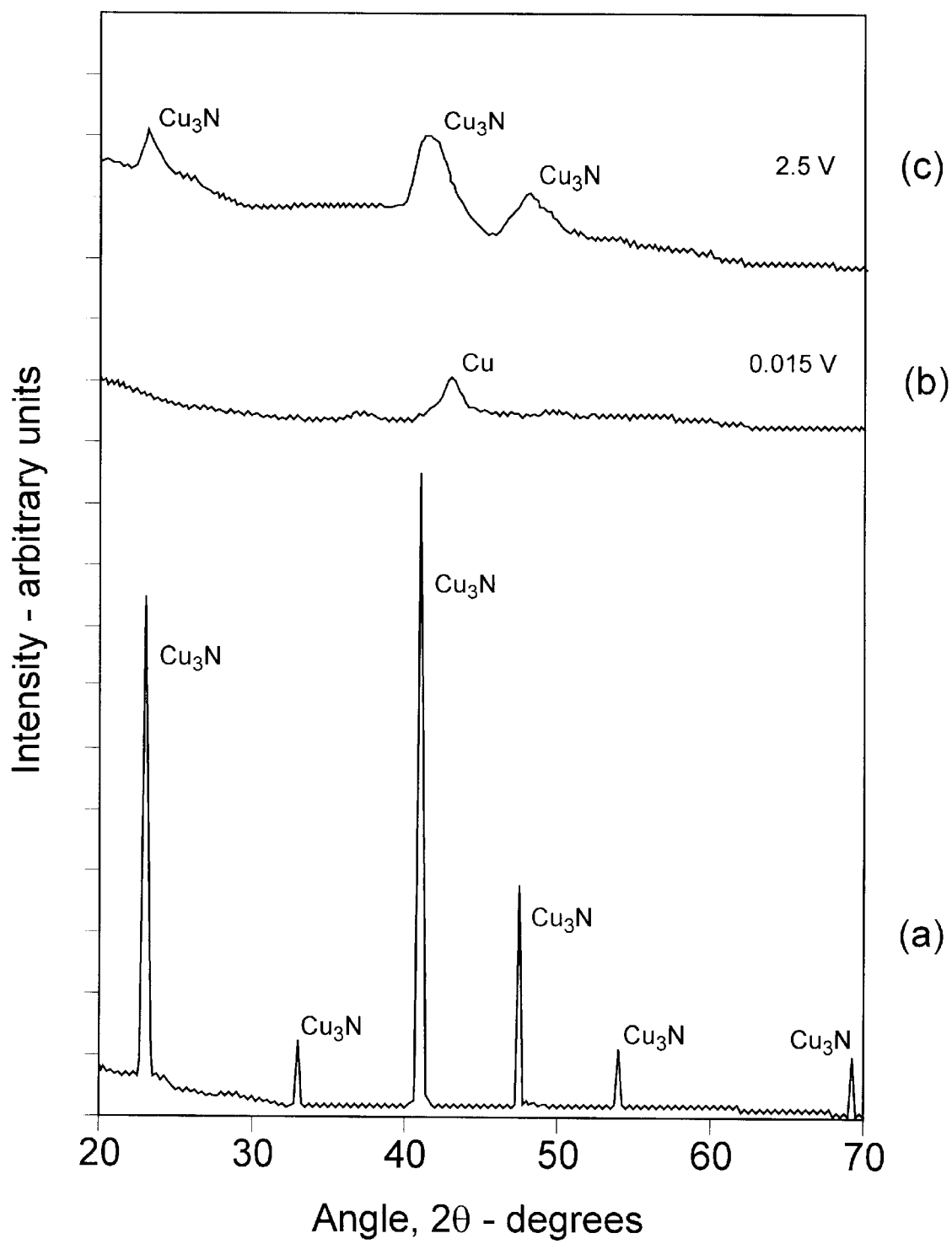
FIG. 8 depicts comparative ex situ XRD traces of a rechargeable battery cell $Cu_3N$ electrode material of the present invention at various stages during reversible charge/discharge cycling.

The foregoing cycling activity is shown, in significant part, in the (b) and (c) stages of FIG. 8. Unfortunately, the relatively low ratio of lithiated nitride to copper in the composition substantially masks the former in the XRD trace of FIG. 8(b). The recharged composition trace of FIG. 8(c) also reflects an anomaly in the broadened major $Cu_3N$ peaks due primarily to the reformation of this compound as nano-form material to which the advantageous performance of the cell is believed to be in great part attributable.

EXAMPLE V

A Li-ion cell embodiment comprising $Cu_3N$ negative electrode material was prepared in the manner of Example III, the respective thicknesses of the electrode member layers being adjusted to provide a ratio about 2:1 spinel:nitride compound. The activated battery cell was tested as in Example IV and provided substantially similar performance results.

Utilization of the crystalline metal nitride electrode materials of the present invention in Li-ion battery cell configurations with other previously employed positive electrode compositions comprising, for example, such intercalation compounds as $LiMn_2O_4$, $LiCoO_2$, $LiNiO_2$, and the like, provides similarly impressive results and likewise promises to improve dramatically the efficacy and economics of rechargeable battery cells for the electronics industry.

It is anticipated that other embodiments and variations of the present invention will become readily apparent to the skilled artisan in the light of the foregoing description and examples, and such embodiments and variations are intended to likewise be included within the scope of the invention as set out in the appended claims.

What is claimed is:

1. A rechargeable electrochemical energy storage system comprising:
   a first electrode member of first polarity;
   a second electrode member of second polarity opposite said first polarity;
   a separator member interposed between said first and second electrode members, said separator member providing an electrolyte;
   wherein said first electrode member comprises crystalline LiZnN.

2. An energy storage system according to claim 1 wherein said system comprises a lithium battery cell.

3. An energy storage system according to claim 2 wherein said system comprises a Li-ion battery cell.

4. An energy storage system according to claim 3 wherein said second electrode member comprises a positive active material comprising a lithiated transition metal oxide.

5. An energy storage system according to claim 1 wherein said first electrode member comprises LiZnN;
   said second electrode member comprises an active material source of lithium ions; said electrolyte comprises a non-aqueous solution of a dissociable lithium salt; and
   during the charging and discharging of said system said active materials participate in a reversible reaction as follows:

$$Li^+_{2+x} + LiZnN \leftrightarrows Li_3N + Li_xZn.$$

6. A rechargeable lithium battery cell comprising:
   a positive electrode member;
   a negative electrode member;
   a separator member interposed between said positive and negative electrode members, said separator member providing an electrolyte;
   wherein said negative electrode member comprises crystalline LiZnN.

7. A battery cell according to claim 6 wherein said positive electrode member comprises a positive active material of a lithiated transition metal oxide.

8. A rechargeable electrochemical battery cell comprising:
   a positive electrode member comprised of positive active electrode material;
   a negative electrode member comprised of negative active electrode material;
   a separator interposed between said positive and negative electrode members, said separator being electrically insulative and ion-conductive and providing an electrolyte;
   wherein said negative active electrode material comprises crystalline LiZnN;
   said positive active electrode material comprises a source of lithium ions;
   said electrolyte comprises a non-aqueous solution of a dissociable lithium salt; and
   during the charging and discharging of said cell said active materials participate in a reversible reaction as follows:

$$Li^+_{2+x} + LiZnN \leftrightarrows Li_3N + Li_xZn.$$

9. A battery cell according to claim 8 wherein said positive active electrode material is a lithiated transition metal oxide.

\* \* \* \* \*